United States Patent
Miyamoto et al.

(10) Patent No.: US 12,394,180 B2
(45) Date of Patent: Aug. 19, 2025

(54) IMAGE RECOGNITION METHOD, IMAGE RECOGNITION APPARATUS AND COMPUTER-READABLE NON-TRANSITORY RECORDING MEDIUM STORING IMAGE RECOGNITION PROGRAM

(71) Applicant: KYOCERA Document Solutions Inc., Osaka (JP)

(72) Inventors: Takuya Miyamoto, Osaka (JP); Kanako Morimoto, Osaka (JP); Rui Hamabe, Osaka (JP); Shiro Kaneko, Osaka (JP); Naomichi Higashiyama, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 510 days.

(21) Appl. No.: 17/814,030

(22) Filed: Jul. 21, 2022

(65) Prior Publication Data
US 2023/0033875 A1    Feb. 2, 2023

(30) Foreign Application Priority Data
Jul. 27, 2021 (JP) ................................ 2021-122352

(51) Int. Cl.
    *G06V 10/77*    (2022.01)
    *G06V 10/26*    (2022.01)

(52) U.S. Cl.
    CPC .......... *G06V 10/7715* (2022.01); *G06V 10/26* (2022.01)

(58) Field of Classification Search
    CPC .. G06V 10/7715; G06V 10/26; G06V 10/993; G06V 10/82
    See application file for complete search history.

(56) References Cited

U.S. PATENT DOCUMENTS

| | | | |
|---|---|---|---|
| 10,417,816 B2 * | 9/2019 | Satzoda | G06F 18/24 |
| 2006/0039593 A1 | 2/2006 | Sammak et al. | |

(Continued)

FOREIGN PATENT DOCUMENTS

| | | |
|---|---|---|
| CN | 109583489 | 4/2019 |
| JP | 2017-13375 | 1/2017 |

(Continued)

OTHER PUBLICATIONS

JPO, Office Action of JP 2021-122352 dated Mar. 27, 2025, total 15 pages.

(Continued)

*Primary Examiner* — Tom Y Lu
(74) *Attorney, Agent, or Firm* — LEX IP MEISTER, PLLC

(57) ABSTRACT

A feature-amount extraction unit generates a base feature-map group constituted by a plurality of base feature maps from an input image, applies a plurality of statistic calculations to the base feature maps in the base feature-map group, and generates a plurality of types of statistic maps. The inference unit derives inference results of segmentation for inference inputs based on the plurality of statistic maps. Each of the plurality of types of statistic calculations described above is processing of calculating a statistic with a specific window size and a specific calculation formula, and the plurality of types of statistic calculations are different from each other in at least either one of the window size and the calculation formula.

9 Claims, 6 Drawing Sheets

(56) References Cited

U.S. PATENT DOCUMENTS

| | | |
|---|---|---|
| 2018/0108138 A1 | 4/2018 | Kluckner et al. |
| 2018/0365888 A1* | 12/2018 | Satzoda ............... G05D 1/0251 |
| 2020/0089151 A1* | 3/2020 | Yoshino ............. G03G 15/5041 |
| 2020/0302248 A1* | 9/2020 | Zhang ...................... G06N 5/01 |
| 2022/0092856 A1* | 3/2022 | Wu ........................ G06V 20/17 |
| 2022/0383538 A1* | 12/2022 | Tang ......................... G06T 7/73 |
| 2023/0144209 A1* | 5/2023 | Cai ...................... G06N 3/0464 |

FOREIGN PATENT DOCUMENTS

| | | |
|---|---|---|
| JP | 2018-515197 | 6/2018 |
| JP | 2019-20138 | 2/2019 |

OTHER PUBLICATIONS

Masanori Suganuma et al,., "Image Classification Based on Hierarchical Feature Construction Using Genetic Programming", Information Processing Society of Japan, vol. 9, No. 3, pp. 44-53, Dec. 14, 2016.

Olaf Ronneberger et al., "U-Net: Convolutional Networks for Biomedical Image Segmentation", arXiv:1505.04597v1 [cs.CV] May 18, 2015, total 8 pages.

* cited by examiner

IMAGE RECOGNITION METHOD, IMAGE RECOGNITION APPARATUS AND COMPUTER-READABLE NON-TRANSITORY RECORDING MEDIUM STORING IMAGE RECOGNITION PROGRAM

INCORPORATION BY REFERENCE

This application is based upon, and claims the benefit of priority from, corresponding Japanese Patent Application No. 2021-122352 filed in the Japan Patent Office on Jul. 27, 2021, the entire contents of which are incorporated herein by reference.

BACKGROUND

Field of the Invention

The present disclosure relates to an image recognition method, an image recognition apparatus, and a computer-readable non-transitory recording medium storing an image recognition program.

Description of Related Art

In recent years, inference units (classifiers, for example) derived from machine learning have been put into practical use.

Generally, in such inference units, a large amount of teacher data is required in order to acquire inference results with sufficient accuracy, and in a case of relatively little teacher data, good inference results cannot be acquired due to bias in the teacher data.

In order to suppress influences of such teacher data bias, group learning may be used in some cases. In group learning, a plurality of inference units highly independent of one another are used, and from the inference results of these plural inference units, one final inference result is acquired by majority vote or the like.

On the other hand, in the image recognition field, some image processors apply a spatial filter that extracts specific shapes (such as lines) of a plurality of sizes and in plural directions to an input image to be a target of the image recognition so as to detect specific shapes of a certain size facing in a certain direction included in the input image.

Also, an inspection apparatus (a) uses a machine learning model to derive a determination result on whether the input image contains abnormality or not, (b) calculates a degree of association between the image containing the abnormality and the input image and between the image not containing the abnormality and the input image, and evaluates credibility of the determination result described above on the basis of the degree of association.

SUMMARY

The image recognition method according to the present disclosure includes feature-amount extraction of generating a base feature-map group constituted by a plurality of base feature maps from an input image, and applying a plurality of types of statistic calculations to the base feature maps in the base feature-map group thereby generating a plurality of statistic maps, and inference of deriving inference results of segmentation by an inference unit for inference inputs based on the plurality of statistic maps. Each of the plurality of types of statistic calculations is processing of calculating a statistic with a specific window size and a specific calculation formula, and the plurality of types of statistic calculations are different from each other in at least either one of the window size and the calculation formula.

The image recognition apparatus according to the present disclosure includes a feature-amount extraction unit that generates a group of the base feature maps constituted by a plurality of base feature maps from an input image, and applies a plurality of types of statistic calculations to the base feature maps in the base feature-map group thereby generating a plurality of statistic maps and an inference unit that derives inference results of segmentation by the inference unit for inference input based on the plurality of statistic maps. Each of the plurality of types of statistic calculations is processing of calculating a statistic with a specific window size and a specific calculation formula, and the plurality of types of statistic calculations are different from each other in at least either one of the window size and the calculation formula.

In a computer-readable non-transitory recording medium storing an image recognition program according to the present disclosure, the image recognition program causes a computer to function as a feature-amount extraction unit which generates a base feature-map group constituted by a plurality of base feature maps from an input image, and applies a plurality of types of statistic calculations to the base feature maps in the base feature-map group thereby generating a plurality of statistic maps and an inference unit which derives inference results of segmentation by the inference unit for the inference input based on the plurality of statistic maps. Each of the plurality of types of statistic calculations is processing of calculating a statistic with a specific window size and a specific calculation formula, and the plurality of types of statistic calculations are different from each other in at least either one of the window size and the calculation formula.

The above or other objects, features and advantages of the present disclosure will become further apparent from the following detailed description together with the accompanying drawings.

DETAILED DESCRIPTION

Hereinafter, embodiments of the present disclosure will be explained with reference to drawings.

Embodiment 1

Figure 1:
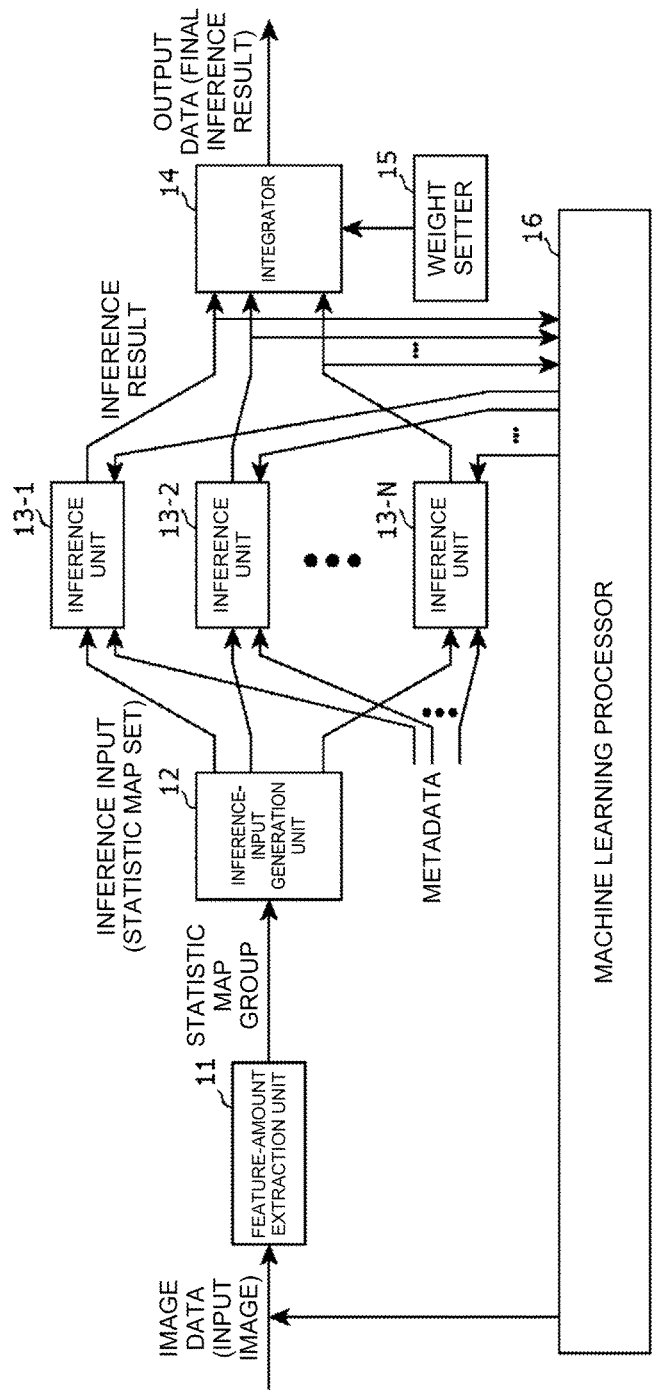
FIG. 1 is a block diagram illustrating a configuration of an image recognition apparatus according to Embodiment 1 of the present disclosure.

FIG. 1 is a block diagram illustrating a configuration of an image recognition apparatus according to Embodiment 1 of the present disclosure; The image recognition apparatus shown in FIG. 1 is an electronic device such as a multifunction printer, a scanner or the like, a terminal device such as a personal computer, and a server on a network and the like, and the computer is caused to function as a processor which will be described later by executing the image recognition program on the built-in computer.

The image recognition apparatus shown in FIG. 1 includes a feature-amount extraction unit 11, an inference-input generation unit 12, a plurality of inference units 13-1 to 13-N (N>1), an integrator 14, a weight setter 15, and a machine-learning processor 16.

The feature-amount extraction unit 11 generates a group of base feature maps constituted by a plurality of base feature maps from the input image, applies a plurality of statistic calculations to the base feature maps in the base feature-map group, and generates a plurality of statistic maps.

The input image is an image taken by a scanner, not shown, an image based on image data received by a communication device, not shown, an image based on image data stored in a storage device or the like, not shown, and is an image to be a target of image recognition.

In addition, the plurality of base feature maps described above are extracted from the input image in a plurality of specific processing (here, spatial filtering processing), respectively. For example, tens to hundreds of base feature maps are generated and form a single base feature-map group.

In addition, the statistic map shows a value of a calculation result of the statistic calculation (average, variance and the like) for each pixel location.

Figure 2:
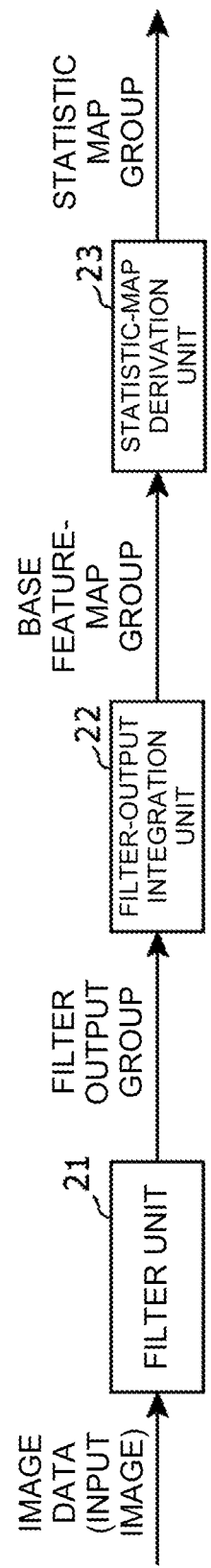
FIG. 2 is a block diagram illustrating a configuration of a feature-amount extraction unit 11 in FIG. 1.
Figure 3:
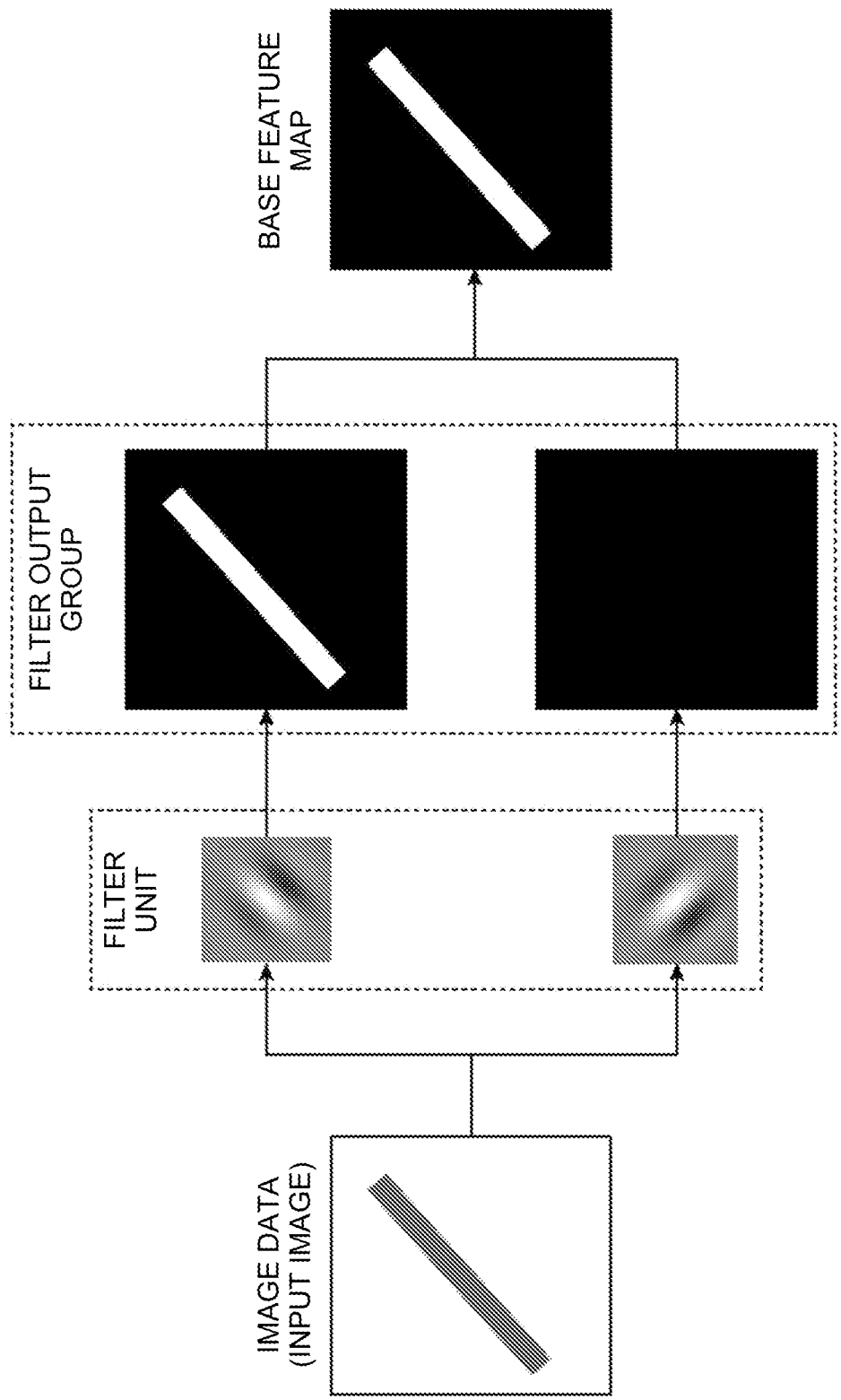
FIG. 3 is a diagram illustrating an example of an operation of the feature-amount extraction unit 11 shown in FIG. 2.

FIG. 2 is a block diagram illustrating a configuration of a feature-amount extraction unit 11 in FIG. 1. FIG. 3 is a diagram illustrating an example of an operation of the feature-amount extraction unit 11 shown in FIG. 2.

As shown in FIG. 2, the feature-amount extraction unit 11 includes a filter unit 21, a filter output integrator 22, and a statistic-map derivation unit 23. The filter unit 21 executes filter processing on the input image with a plurality of spatial filters with specific characteristics, and the filter output integrator 22 generates a base feature map on the basis of a plurality of filter processing results by the filter unit 21 at each position in the input image.

For example, as shown in FIG. 3, in order to detect specific shapes (lines such as straight lines and curved lines, points, circles, polygons and the like), a plurality of spatial filters with different detection sensitivity depending on a direction are used for each of plurality of sizes, and a base feature map containing a shape of a logical sum of filter outputs of the plurality of spatial filters is generated. For example, if a linear shape appears only in the filter output of one spatial filter and the shape does not appear in the filter outputs of all the other spatial filters, a base feature map including that linear shape is generated. In addition, if, for example, a linear shape appears in the filter outputs of the plurality of spatial filters, a base feature map containing the points at intersections of the linear shapes (that is, the point shapes that are logical products of the linear shapes) is generated.

For this spatial filter, a two-dimensional Gabor filter is used, for example. In that case, the two-dimensional Gabor filter with filter characteristics tailored to the spatial frequency corresponding to the size of the detection target is used. Alternatively, a second-order differential spatial filter that detects shape edges may be used as this spatial filter.

Here, the base feature map has two-dimensional data indicating positions, sizes, and directions of a plurality of specific shapes, and the plurality of specific shapes are detected in the input image by the spatial filtering processing as the specific processing described above, for example. Alternatively, the base feature map may be image data in a specific color (each color plane) of the input image. As described above, the base feature maps having shape information and the base feature maps having color information are used as needed, respectively.

Figure 4:
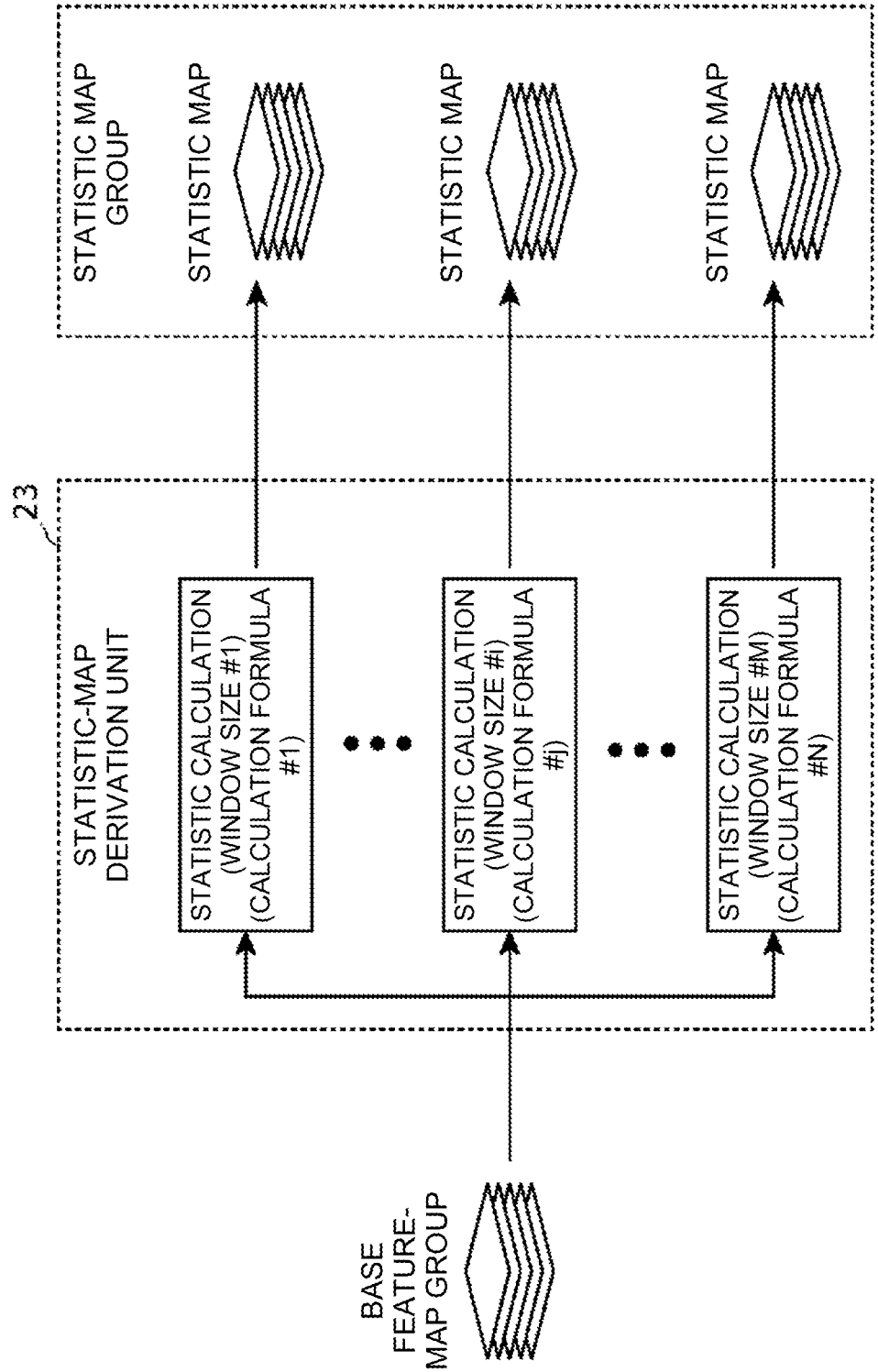
FIG. 4 is a diagram illustrating an operation of a statistic-map derivation unit 23 in FIG. 3.

FIG. 4 is a diagram for explaining an operation of the statistic-map derivation unit 23 in FIG. 3. For example, as shown in FIG. 4, the statistic-map derivation unit 23 performs a plurality of types of statistic calculations on the base feature map, whereby a statistic map is generated.

Each of the aforementioned plurality of types of statistic calculations is processing to calculate a statistic by a specific calculation formula (calculation formula for a specific statistic such as average, variance and the like) with a specific window size (pixel size of vertical and horizontal sides of the window centered on the pixel of interest), and at least either one of the window size and the calculation formula is different from each other among the plurality of types of statistic operations.

For example, in an input image containing characters, if there are linear abnormal objects, since the number, size, density and the like of local lines differ between the characters and the abnormal objects, the abnormal areas (that is, if there are abnormal objects) can be detected by using various spatial statistics.

In other words, the statistic-map derivation unit 23 executes filtering calculation processing to derive statistics such as average, variance and the like with specified window sizes for each type of the statistic calculations for one pixel at a time for the base feature map and generates a statistic map of the same size as the base feature map (same number of pixels in height and width). Note that the statistic-map derivation unit 23 may generate a statistic map by executing the filtering calculation processing described above at N pixel intervals (N>1) (that is, only one pixel per N pixels). In that case, the number of pixels in the statistic map is reduced and thus, a calculation amount of the subsequent processing can be reduced.

Returning to FIG. 1, the inference-input generation unit 12 generates an inference input from its statistic map group (the plurality of statistic maps described above). In this embodiment, the plurality of inference inputs are input data input into inference units 13-1 to 13-N, respectively.

Each of the plurality of inference inputs has some or all of the plurality of statistic maps described above, and each inference input in the plurality of inference inputs has a statistic map partially or wholly different from the statistic maps of the other inference inputs in the plurality of inference inputs.

Each of the plurality of base feature maps described above is extracted from the input image in the plural specific processing, and each inference input has one or a plurality of statistic maps selected from the plurality of statistic maps corresponding to the plural specific processing.

One of the plurality of inference inputs described above may have all the base feature maps in the base feature map group.

For example, each of the plurality of inference inputs described above has one or a plurality of statistic maps selected correspondingly to the plural specific processing described above. In other words, in all the statistic maps, only the statistic map generated from the base feature map acquired in specific processing constitutes some inference input.

Here, the base feature map has two-dimensional data indicating positions, sizes, and directions of a plurality of specific shapes, and the plurality of inference inputs are one or a plurality of statistic maps classified by the size.

Figure 5:
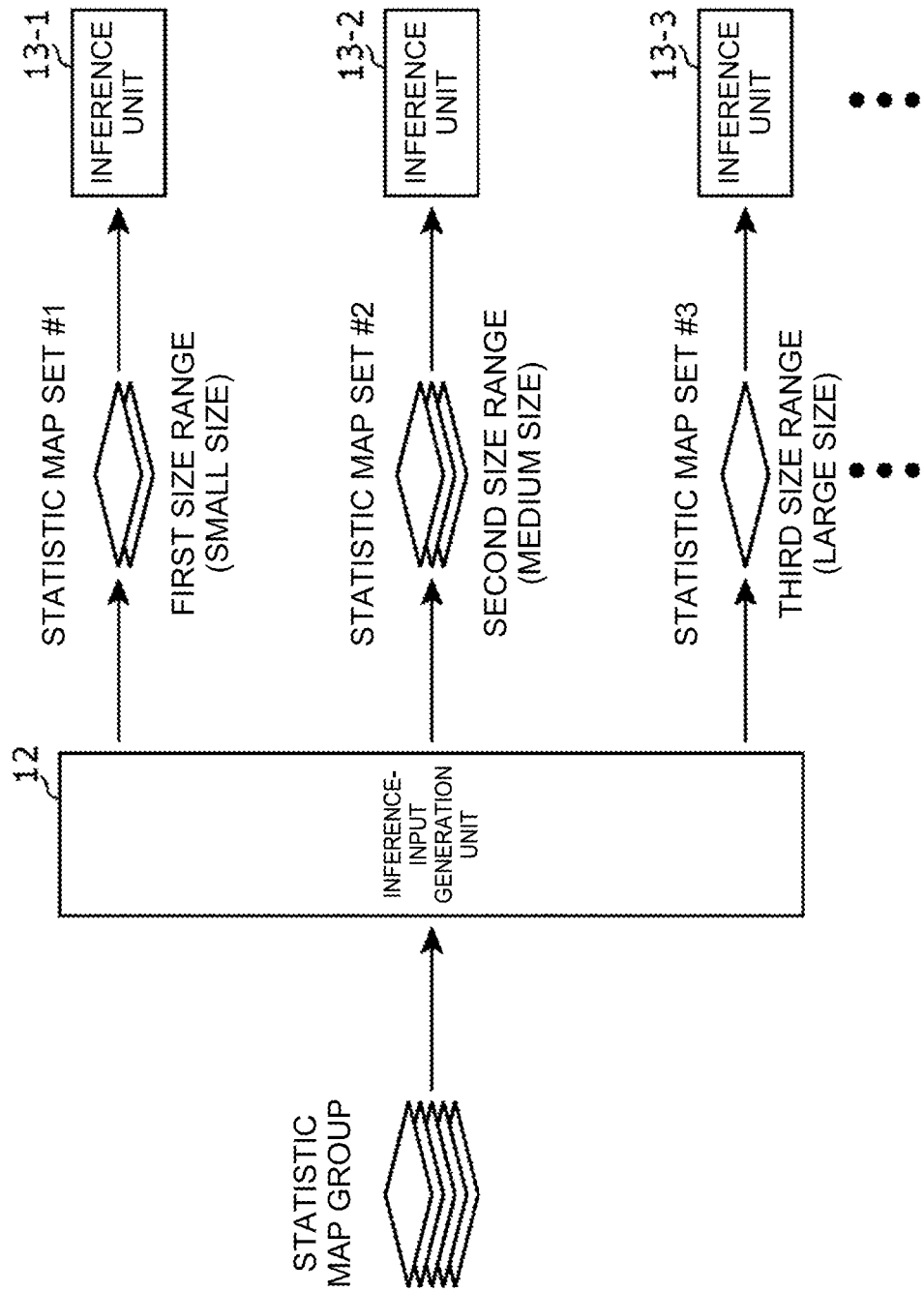
FIG. 5 is a diagram illustrating an example of an operation of an inference-input generation unit 12 in FIG. 1.

FIG. 5 is a diagram for explaining an example of an operation of the inference-input generation unit 12 in FIG. 1. For example, as shown in FIG. 5, the plurality of inference inputs described above are one or a plurality of statistic maps classified by the size, for example. Specifically, a plurality of size ranges are set, and for each size range, one or a plurality of statistic maps (hereinafter, referred to as statistic map set) with the sizes of specific shapes belonging to the size range are used as one inference input. In other words, they are classified by the size and not by the position or method, here. Note that each size range may overlap partially or wholly with the other size ranges.

Moreover, each inference input may include data other than one or a plurality of statistic maps selected from the statistic map group (metadata such as parameters that may affect inference results). As such metadata, environmental data at the time of image acquisition (temperature, humidity, time of day, information on a state of an object to be photographed and the like. For example, if the input image is a photographic image taken by a camera, the environmental data at the time the image was taken), knowledge information (position and size of a region of interest) and the like are used.

Note that the plurality of inference inputs described above may also be one or a plurality of statistic maps classified by either one or both of the window size and the calculation formula in the statistic calculation.

Returning to FIG. 1, the inference unit 13-$i$ ($i$=1, . . . , N) derives segmentation inference results (classification results and the like of presence or absence of abnormalities at each pixel position) for the plurality of inference inputs based on the plurality of statistic maps described above.

Specifically, in Embodiment 1, the plurality of inference units 13-$i$ derive, for the plurality of inference inputs based on the plurality of statistic maps described above, a plurality of inference results, respectively, and the integrator 14 integrates the plurality of inference results in a specific method so as to derive a final inference result.

In Embodiment 1, the inference unit 13-$i$ is a machine-learned inference unit. Note that, in the teacher data used for the machine learning of the inference unit 13-$i$, such input images are used that can acquire a base feature map distributed in all the directions without a bias in the positions and directions of the specific shapes described above.

In Embodiment 1, the inference unit 13-$i$ is a processing unit that derives the inference results for the inference inputs based on the base feature-map group described above and is a machine-learning processing unit such as deep learning. For example, each inference unit 13-$i$ ($i$=1, . . . , N) is a convolutional neural network (Convolutional Neural Network (CNN). For example, a plurality of inference units 13-1 to 13-N are supposed to be 3 or more inference units.

The integrator 14 is a processing unit that integrates the plurality of inference results acquired by the plurality of inference units 13-1 to 13-N by a specific method (majority voting, class affiliation probability and the like) so as to derive a final inference result. For example, the integrator 14 may derive the final inference result by majority voting on a plurality of inference results, or on the basis of an average or a sum of class affiliation probabilities for a plurality of classes (presence or absence of abnormalities, for example) on the plurality of reference results.

In this embodiment, the integrator 14 integrates the plurality of inference results described above in a specific method to derive a final inference result, taking into account of weight coefficients for the plurality of inference results described above. Note that the final inference result may be derived by integration without considering the weight coefficients. The higher the reliability level of the inference result is, the larger the weight coefficient is set.

Note that the integrator 14 may be a machine-learned integrator that integrates the plurality of inference results described above so as to derive the final inference result. Alternatively, the integrator 14 may use other existing methods to integrate the plurality of inference results described above so as to derive the final inference result.

The weight setter 15 is a processing unit that derives and sets the aforementioned weight coefficients in the integrator 14. The weight factor values may be set on the basis of manually entered values or automatically as follows.

For example, the weight setter 15 may derive the aforementioned weight coefficients on the basis of each of inference accuracy of the plurality of inference units 13-1 to 13-N and set it to the integrator 14. In that case, for example, it may be so configured that the machine-learning processor 16, which will be described below, derives the inference accuracy of each of the inference units 13-$i$ by using cross-validation (a validation method in which processing of dividing the teacher data, of using a part thereof for the machine learning to derive inference results, and of using the remainder for validation of the inference results is repeatedly executed while changing the division pattern), and the weight setter 15 derives the aforementioned weight coefficients of the inference results of the plurality of inference units 13-1 to 13-N on the basis of the inference accuracy of the plurality of inference units 13-1 to 13-N derived by the machine-learning processor 16.

Moreover, in that case, the inference accuracy of each of the inference units 13-$i$ may be presumed from the input image by an image recognition algorithm using, for example, a CNN or the like. Alternatively, for example, it may be so configured that, on the basis of distribution of specific feature amounts (shape, color and the like) of the input image in question and the distribution of specific feature amounts of the input image in the teacher data used for machine learning of the plurality of inference units 13-1 to 13-N, the weight setter 15 derives the aforementioned weight coefficients and sets them to the integrator 14.

The machine-learning processor 16 is a processing unit which executes the machine learning step in which the machine learning of the plurality of inference units 13-1 to 13-N is performed in accordance with an existing learning method corresponding to the calculation model (here, CNN) of the inference units 13-1 to 13-N. In the machine learning of the plurality of inference units 13-1 to 13-N, the machine learning of each inference unit 13-$i$ is performed independently.

Specifically, the teacher data containing a plurality of pairs of input images and final inference results is prepared in a storage device or the like, not shown, and the machine-learning processor 16 acquires the teacher data, inputs each pair of the input images to the feature-amount extraction unit 11, acquires the inference results output from the inference units 13-1 to 13-N correspondingly to the input images, respectively, and on the basis of a comparison result between the output inference result and the final inference result of the pair of the teacher data, adjusts parameter values of each inference unit 13-$i$ (CNN weights and bias values) independently of the other inference units 13-$j$.

The machine-learning processor 16 may perform the machine learning by excluding regions other than the specific part region specified by that teacher data in the input image of the teacher data used for the machine learning described above. In other words, in that case, regions that should be focused in image recognition (region in which specific components are captured in a machine or the like, region with a possibility that abnormality that should be detected occurs in image recognition and the like) are specified as specific part regions, and the machine learning is performed by excluding the regions other than them so that the machine learning proceeds efficiently. For example, the machine learning is performed efficiently with a relatively small amount of teacher data by limiting to the region with a possibility that specific abnormality that should be detected occurs in image recognition and by extracting the base feature map with a specific shape corresponding to the abnormality.

Note that, if the machine learning of the inference units 13-1 to 13-N has been completed, the machine-learning processor 16 does not have to be provided.

Next, the operation of the image recognition apparatus according to Embodiment 1 will be described.

(a) Machine Learning of Inference Units 13-1 to 13-N

As the teacher data, a plurality of pairs of the input images and the final inference results (that is, correct image recognition results) are prepared in a storage device or the like, not shown. And the machine-learning processor 16 uses that teacher data to perform the machine learning of the inference units 13-1 to 13-N.

In the machine learning, when the machine-learning processor 16 selects one piece of the teacher data and inputs one input image of the teacher data into the feature-amount extraction unit 11, the feature-amount extraction unit 11 generates a statistic map group from that input image, and inference-input generation unit 12 generates each inference input from the statistic map group and inputs it into each inference unit 13-$i$. Then, the inference units 13-1 to 13-N derive the inference results for the inference inputs, respectively, on the basis of a state at the current time (the CNN parameter values and the like). Then, the machine-learning processor 16 compares the inference result corresponding to the input image of the teacher data with the final inference result of the teacher data and updates the state of each of the inference units 13-1 to 13-N on the basis of the comparison result by a specific algorithm.

Note that, in the machine learning, this sequence of processing is repeated in accordance with a specific machine learning algorithm depending on values of hyperparameters such as the number of epochs.

(b) Image Recognition of Input Image to be Recognized (Segmentation)

After the machine learning described above, image recognition is performed for the input image to be recognized. At that time, the input image (input image data) acquired by a controller or the like, not shown, is input into the feature-amount extraction unit 11. When that input image is input into the feature-amount extraction unit 11, the feature-amount extraction unit 11 generates a statistic map group from that input image, and inference-input generation unit 12 generates each inference input from the statistic map group and inputs it to each inference unit 13-$i$. Then, the inference units 13-1 to 13-N derive the inference results for the inference inputs, respectively, on the basis of the machine-learned state (the CNN parameter values and the like). Then, the integrator 14 derives and outputs the final inference result from those inference results. The final inference result is a two-dimensional map showing a degree of abnormality at each pixel position.

As described above, according to the above Embodiment 1, the feature-amount extraction unit 11 generates a base feature-map group constituted by a plurality of base feature maps from the input image and generates a plurality of the statistic maps by applying a plurality of types of statistic calculations for the base feature maps in the base feature-map group. The inference unit 13-$i$ derives the inference results of segmentation for the inference inputs based on the plurality of statistic maps. Each of the plurality of types of statistic calculations described above is processing of calculating a statistic with a specific window size and a specific calculation formula, and the plurality of types of statistic calculations are different from each other in at least either one of the window size and the calculation formula.

As a result, a plurality of base feature maps indicating various feature amounts are generated from the input image and moreover, a combination of statistic maps indicating various statistics of the plurality of base feature maps is used as an inference input, and the inference result of segmentation is acquired by the inference unit 13-$i$ and thus, even when the machine learning is used, favorable segmentation can be performed with a relatively small amount of teacher data.

Also, since favorable inference results can be acquired with a relatively small amount of teacher data, even when there is a little teacher data at an individual and small-scale site requiring image recognition, favorable inference results suitable for that site can be acquired. In addition, the statistic map visualizes the input of each inference unit 13-$i$, whereby explanation of the input-output relationship of each inference unit 13-$i$ is facilitated.

As described above, a base feature map showing feature amounts such as color, direction, spatial frequency (object size) and the like is generated correspondingly to processing in a V1 field of a human visual cortex, and statistic maps are generated correspondingly to the subsequent high-order processing of the human visual cortex, which enables general-purpose image recognition (abnormality detection, here) in a manner similar to human image recognition.

Embodiment 2

In Embodiment 2, instead of the inference units 13-1 to 13-N, the integrator 14, the weight setter 15, and the machine-learning processor 16, inference units that generate inference results by clustering without using the machine learning are used. In other words, the machine learning is not required in Embodiment 2.

Figure 6:
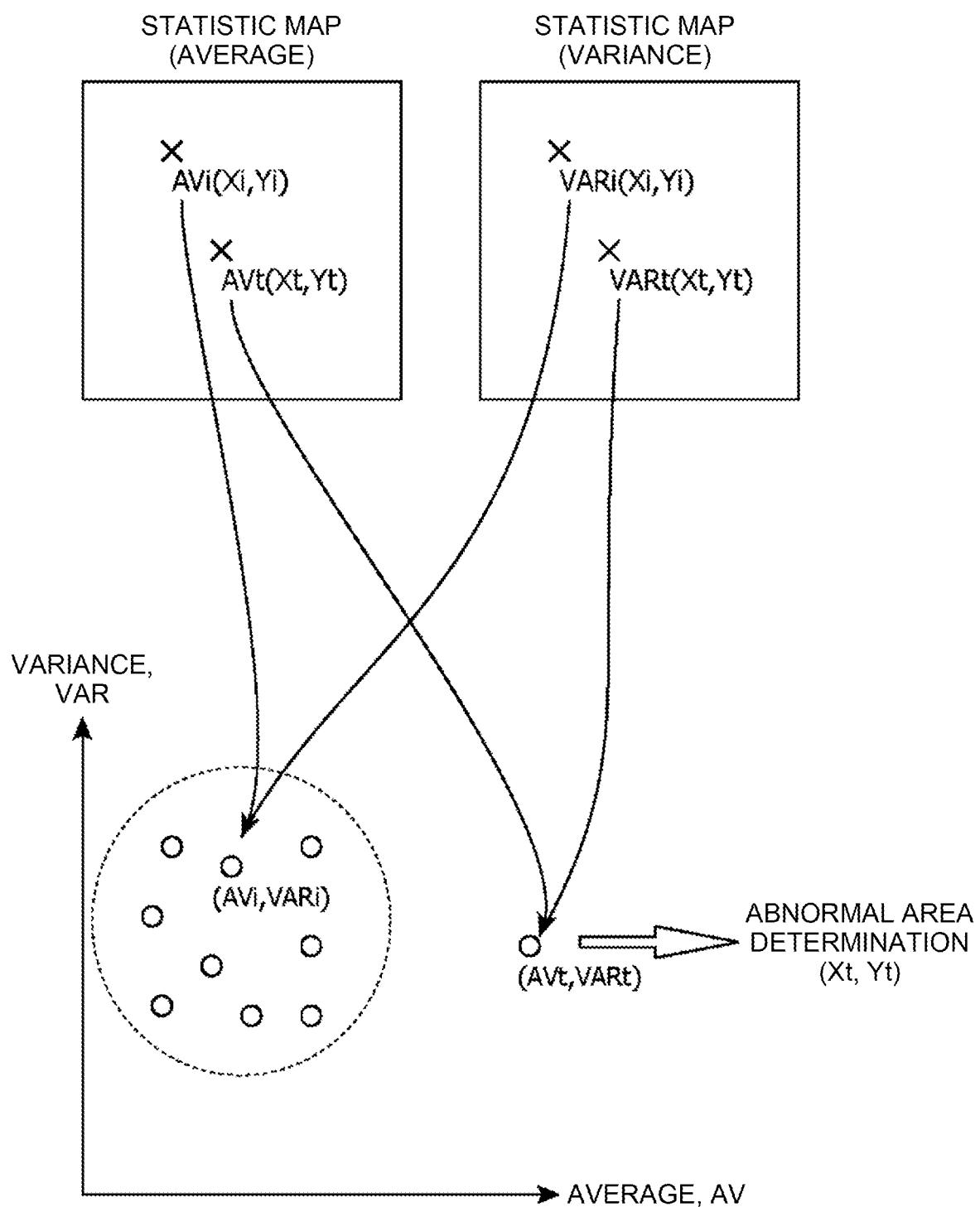
FIG. 6 is a diagram illustrating clustering in the image recognition apparatus according to Embodiment 2.

FIG. 6 is a diagram illustrating the clustering in the image recognition apparatus according to Embodiment 2. For example, in Embodiment 2, (a) from all the statistic maps, the statistic maps corresponding to the same specific processing (spatial filtering processing described above), the statistic map corresponding to the same window size and the same statistic calculation formula is extracted by the inference-input generation unit 12 as the inference input; (b) on a feature-amount space (in FIG. 2, the two-dimensional space of average and variance) by the feature amounts (average and variance, for example) indicated by those statistic maps, a pixel position or a feature amount at a position of the part region is plotted for the pixel position or the position of the part region with a specific size; and (c) among those plots, a plot with a Mahalanobis distance larger than a specific value is determined to be an abnormal area, and the position of the plot is identified as the position of the abnormal area. This results in segmentation of the abnormal area. Note that, in FIG. 2, the feature-amount space is a two-dimensional space with two feature amounts, but it can also be a three-dimensional or larger space with three or more feature amounts.

Note that the other configurations and operations of the image recognition apparatus according to Embodiment 2 are similar to those in Embodiment 1 and thus, the description is omitted.

As described above, according to Embodiment 2 above, favorable segmentation can be performed without using the machine learning.

Note that various changes and modifications to the aforementioned embodiments are obvious to those skilled in the art. Such changes and modifications may be made without departing from the spirit and scope of the present subject matter and without diminishing its intended advantages. It is therefore intended that such changes and modifications be covered by the appended claims.

For example, in Embodiment 1 above, it may be so configured that each of the inference units 13-1 to 13-N includes a multi-layered inference part, and each inference unit 13-i uses the multi-layered inference part to derive inference results in accordance with a stacking method of ensemble learning.

Moreover, in the above Embodiment 1, when the aforementioned metadata is to be input into the inference units 13-1 to 13-N, the same metadata may be input into the inference units 13-1 to 13-N, or the metadata corresponding to each inference unit 13-i (different from each other) may be input into the inference units 13-1 to 13-N.

The present disclosure is applicable, for example, to image recognition.

What is claimed is:

1. A computer-implemented image recognition method, comprising:
   feature-amount extraction of generating a base feature-map group constituted by a plurality of base feature maps from an input image, and applying a plurality of types of statistic calculations to the base feature maps in the base feature-map group thereby generating a plurality of statistic maps;
   inference of deriving inference results of segmentation using an inference unit for inference inputs based on the plurality of statistic maps; and
   an image recognition of generating an image recognition result of the input image based on the inference result of the segmentation,
   wherein each of the plurality of types of statistic calculations is processing of calculating a statistic with a specific window size and a specific calculation formula, and the plurality of types of statistic calculations are different from each other in at least either one of the window size and the calculation formula, and
   wherein in the feature-amount extraction, the plurality of statistic maps are generated based on the plurality of types of statistic calculations consisting of the window size and the calculation formula that are different from each other in at least one aspect.

2. The image recognition method according to claim 1, wherein
   the base feature map has two-dimensional data indicating positions, sizes, and directions of a plurality of specific shapes, and
   the plurality of inference inputs are one or a plurality of statistic maps classified by the size.

3. The image recognition method according to claim 1, wherein
   the inference unit is a machine-learned inference unit.

4. The image recognition method according to claim 1, wherein
   the inference unit generates the inference results by clustering without using machine learning.

5. The image recognition method according to claim 1, further comprising:
   integration, wherein
   in the inference, a plurality of inference results are derived for the plurality of inference inputs based on the plurality of statistic maps by using each of the plurality of the inference units, and in the integration, a final inference result is derived by integrating the plurality of inference results in a specific method.

6. The image recognition method according to claim 5, wherein,
   each of the plurality of inference inputs has some or all of the plurality of statistic maps; and
   each inference input in the plurality of inference inputs has a statistic map partially or wholly different from the statistic maps of the other inference inputs in the plurality of inference inputs.

7. The image recognition method according to claim 5, further comprising:
   inference input generation of generating the plurality of inference inputs from the statistic map group, wherein
   each of the plurality of base feature maps is extracted from the input image in the plural specific processing; and
   the inference input has one or a plurality of statistic maps selected from the plurality of statistic maps corresponding to the plural specific processing.

8. An image recognition apparatus, comprising:
   a feature-amount extraction unit which generates a base feature-map group constituted by a plurality of base feature maps from an input image, and applies a plurality of types of statistic calculations to the base feature maps in the base feature-map group thereby generating a plurality of statistic maps;
   an inference unit which derives inference results of segmentation by an inference unit for inference inputs based on the plurality of statistic maps; and
   an image recognition unit which generates an image recognition result of the input image based on the inference result of the segmentation,
   wherein each of the plurality of types of statistic calculations is processing of calculating a statistic with a specific window size and a specific calculation formula, and the plurality of types of statistic calculations are different from each other in at least either one of the window size and the calculation formula, and
   wherein the feature amount extraction unit generates the plurality of statistic maps based on the plurality of types of statistic calculations consisting of the window size and the calculation formula that are different from each other in at least one aspect.

9. A computer-readable non-transitory recording medium storing an image recognition program, wherein
   the image recognition program causes a computer to function as:
   a feature-amount extraction unit which generates a base feature-map group constituted by a plurality of base feature maps from an input image, and applies a plurality of types of statistic calculations to the base feature maps in the base feature-map group thereby generating a plurality of statistic maps;

an inference unit which derives inference results of segmentation by the inference unit for the inference inputs based on the plurality of statistic maps; and an image recognition unit which generates an image recognition result of the input image based on the inference result of the segmentation, wherein each of the plurality of types of statistic calculations is processing of calculating a statistic with a specific window size and a specific calculation formula; and the plurality of types of statistic calculations are different from each other in at least either one of the window size and the calculation formula, and wherein the feature amount extraction unit generates the plurality of statistic maps based on the plurality of types of statistic calculations consisting of the window size and the calculation formula that are different from each other in at least one aspect.

* * * * *